Aug. 6, 1929.　　T. F. MORRISSEY　　1,723,654
SAFETY SEAT FOR WINDOW CLEANERS
Filed March 2, 1928
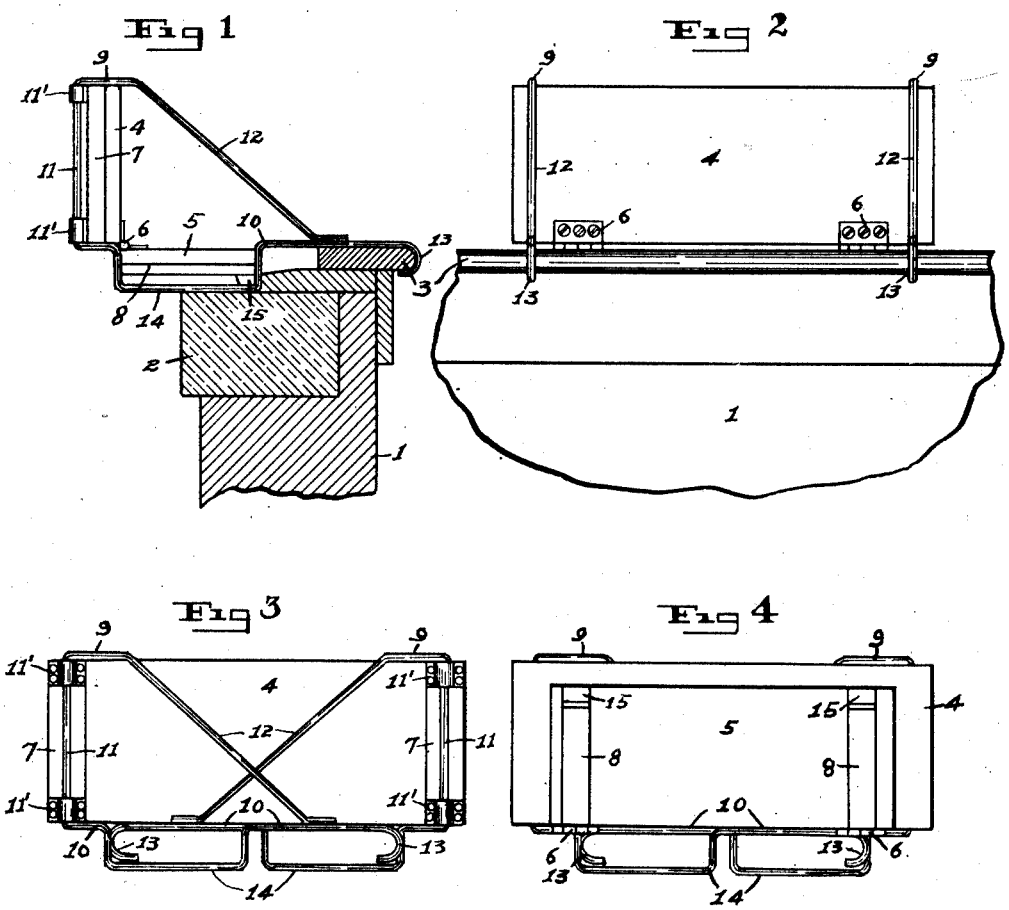
INVENTOR
Thomas F. Morrissey
By Jack R. Snyder
Attorney Patented Aug. 6, 1929.

1,723,654

UNITED STATES PATENT OFFICE.

THOMAS F. MORRISSEY, OF SWISSVALE, PENNSYLVANIA.

SAFETY SEAT FOR WINDOW CLEANERS.

Application filed March 2, 1928. Serial No. 258,479.

My invention relates to a safety seat, and while primarily designed for window cleaners, it will be obvious that the device may be employed for any other purposes wherein it is found to be applicable.

Important objects of the invention are to provide a seat of the character described which may be readily attached in position to any window of the ordinary construction, which will expedite and facilitate the cleaning of the outside of upper and lower window sections with absolute safety to the cleaner, and which may be compactly collapsed to facilitate its transportation and storage.

Further objects of the invention are to provide a device of the class stated which is simple in its construction and arrangement, strong, durable and efficient in its use, and comparatively inexpensive to manufacture.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of the claims hereunto appended without departing from the spirit of the invention.

In the drawing wherein like numerals of references designate corresponding parts throughout the several views:—

Figure 1 is a side view of a window seat constructed in accordance with the invention and attached in position to a window structure, the latter being shown in cross section.

Figure 2 is a front view thereof.

Figures 3 and 4, are, respectively, rear and front views of the device in the collapsed or folded position.

Referring in detail to the drawing 1 denotes the wall of a building structure provided with a stone window ledge 2 and a window sill 3 of the usual construction.

My improved safety seat comprises a back member 4 and a seat member 5. The rear side edge of the latter is joined to the lower edge of the former by a pair of hinges 6. The back member 4 is strengthened by a pair of re-enforcing strips 7, which extend transversely across the back member 4 at respective ends and on the rear side thereof. The seat member is likewise strengthened by a pair of re-enforcing strips 8, which extend transversely across the seat member 5 adjacent to respective ends and on the lower side thereof.

A pair of supporting hangers 9, is provided for attaching and supporting the seat in position to the window structure. Each of the supporting hangers 9 is preferably constructed from a single length of metal rod and comprises a horizontal lower portion 10, a vertical rear portion 11, and an inclined bracing portion 12. The latter extends from the upper end of the vertical rear portion 11 to the horizontal lower portion 10, and has its forward end fixed adjacent to the forward end of the latter by welding or in any other suitable manner.

One of the supporting hangers 9 is disposed at each end of the back member 4. The vertical hanger portion 11 is disposed along the rear side of respective re-enforcing strips 7, and is pivotally connected to the latter by a pair of bearing clips 11', which are respectively fixed at the upper and lower ends of the associated re-enforcing strip 7. The pivotal connection of the pair of supporting hangers 9 to the back member 4, in the manner stated, permits of the swinging of the former flatly against the rear side of the latter, when it is desired to fold the device in the collapsed position, as clearly shown in Figure 3.

The forward portion of the horizontal lower portion 10 projects forwardly from the seat member 5, and the end thereof is formed to provide a hook 13, which overlaps the projecting marginal edge of the window sill 3 for securing the device to the window structure. The horizontal hanger portion 10 is further formed with a depending offset portion 14, which rests upon the top of the window ledge 2, as clearly shown in Figure 1, and sustains most of the weight of the occupant of the device.

The ends of the back member 4 project beyond adjacent ends of the seat member 5, and the lower edges of the former rest upon respective rear ends of the horizontal hanger portions 10. This arrangement likewise positions the lower ends of the back member re-enforcing strips 7 upon the horizontal hanger portion 10, whereby a substantial supporting medium is established.

It will be noted that the seat member 5, being of less length than the back member 4, is disposed between the pair of supporting hangers 9. The rear side of the seat member 5 is supported only by its hinged connection with the back member 4. The seat member 5 is maintained on a level plane with the window sill 3 by securing an elevating block 15 to the under side of each seat member re-enforcing strip 8 at the forward end of the latter. The elevating block 15 seats upon the top of the window ledge 2.

The attachment of the hooks 13 to the window sill 3 in conjunction with the abutment of the elevating blocks 15 against the rear edge of window sill 3, will securely hold the device against movement in the forward or rearward directions.

To fold the device it is only necessary to swing the supporting hangers 9 against the rear side of the back member 4, as stated, and to position the seat member 5, flatly against the back member 4, as clearly shown in Figures 3 and 4.

It is, of course, obvious that the entire seat structure is disposed entirely on the outer side of the window, and provides an efficient safety device enabling the cleaner to clean the outer side of both the lower and upper sections of a window with complete safety.

What I claim is:

1. A safety seat of the character comprising a back member, a seat member having a hinged connection with said back portion, a pair of supporting hangers pivotally connected to the rear side of said back member, each of said pair of supporting hangers including a horizontal portion projecting forwardly from said seat member and having a hook formed at the end thereof, said horizontal portion further provided with a depending offset portion, the end portions of said back member projecting beyond the respective ends of said seat member and seating upon the rear end of said horizontal portion.

2. A safety seat of the character described comprising a back member, a seat member, a pair of hinges joining said back and seat members together to permit of the folding of the top side of said seat member against the forward side of said back member, a pair of supporting hangers connected to the rear side of said back member and shiftable to position same against the rear side of said back member, the end portions of said back member projecting beyond the respective ends of said seat member and seating upon the rear end of said horizontal portion, said pair of hinges supporting the rear end of said seat member.

3. In combination, a safety seat of the character described comprising a back member, a transversely extending re-enforcing strip fixed to each end of said back member on the rear side of the latter, a seat member, a transversely extending re-enforcing strip fixed to each end of said seat member on the lower side of the latter, an elevating block fixed to the under side of each of said seat member re-enforcing strips at the forward end of the latter, a pair of hinges joining said back and seat members to permit of the latter to be positioned flatly against each other, said back member carrying the rear end of said seat member by said pair of hinges, a pair of supporting hangers, a pair of bearing clips pivotally connecting each of said pair of supporting hangers to the rear side of respective back member re-enforcing strips, each of said pair of supporting hangers being shiftable in said bearing clips to position said pair of supporting hangers against the rear side of said back member, each of said pair of supporting hangers including a horizontally disposed portion projecting forwardly from said seat member and having its free forward end formed to provide a hook, said horizontally disposed portion further provided with a depending offset portion, the end portion of said back member projecting beyond the respective ends of said seat member, said projecting end portions of said back member together with the lower ends of its re-enforcing strips seating upon the rear end of said horizontal portion of each of said pair of supporting hangers, substantially as described and for the purpose set forth.

In testimony whereof I affix my signature.

THOMAS F. MORRISSEY.